(12) United States Patent
Koyama et al.

(10) Patent No.: US 9,409,556 B2
(45) Date of Patent: Aug. 9, 2016

(54) BRAKE FLUID PRESSURE CONTROLLING ACTUATOR

(71) Applicants: DENSO CORPORATION, Kariya, Aichi-pref. (JP); Advics Co., Ltd., Kariya, Aichi-pref. (JP)

(72) Inventors: Fumitoshi Koyama, Kariya (JP); Shin Sasaki, Okazaki (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 14/718,420

(22) Filed: May 21, 2015

(65) Prior Publication Data

US 2015/0336549 A1    Nov. 26, 2015

(30) Foreign Application Priority Data

May 22, 2014  (JP) .................. 2014-106206

(51) Int. Cl.
*B60T 8/36* (2006.01)
*B60T 8/34* (2006.01)
*B60T 8/17* (2006.01)

(52) U.S. Cl.
CPC ... *B60T 8/34* (2013.01); *B60T 8/17* (2013.01); *B60T 8/368* (2013.01)

(58) Field of Classification Search
CPC .............. B60T 8/17; B60T 8/34; B60T 8/36; B60T 8/38
USPC .......... 303/115.5, 116.1, 116.3, 116.4, 119.1, 303/119.2, 119.3, DIG. 10; 361/622, 720, 361/796, 807; 251/129.02, 129.05, 129.07
See application file for complete search history.

(56) References Cited

U.S. PATENT DOCUMENTS

| | | | |
|---|---|---|---|
| 5,988,770 A * | 11/1999 | Volz ..................... | B60T 8/3675 303/119.3 |
| 7,110,246 B2 * | 9/2006 | Tsunooka .............. | H01R 13/33 361/637 |
| 2009/0250998 A1 * | 10/2009 | Hinz ....................... | B60T 8/368 303/119.3 |
| 2012/0195007 A1 * | 8/2012 | Yanai .................... | B60T 13/686 361/720 |
| 2013/0033098 A1 * | 2/2013 | Nagashima ............ | B60T 7/042 303/199 |
| 2014/0022717 A1 * | 1/2014 | Bolik .................... | G01D 11/24 361/679.01 |

FOREIGN PATENT DOCUMENTS

| | | |
|---|---|---|
| JP | 09-129287 | 5/1997 |
| JP | 2012-158228 | 8/2012 |
| JP | 2013-193663 | 9/2013 |

* cited by examiner

*Primary Examiner* — Christopher Schwartz
(74) *Attorney, Agent, or Firm* — Harness, Dickey & Pierce, P.L.C.

(57) ABSTRACT

A brake fluid pressure controlling actuator is equipped with a block, an electric device secured to the block, and a casing attached to the block, and a board support with a stay. The brake fluid pressure controlling actuator is designed to have the board support disposed in the casing and also have a circuit board placed in contact with the stay of the board support. The stay of the board support serves to firmly hold a portion of the circuit board around a through-hole formed in the circuit board when a terminal of an electric device is press-fitted into the through-hole, thereby minimizing the degree of bending of the circuit board to ensure the stability in electrically connecting the electric device to the circuit board.

7 Claims, 4 Drawing Sheets

BRAKE FLUID PRESSURE CONTROLLING ACTUATOR

CROSS REFERENCE TO RELATED DOCUMENT

The present application claims the benefit of priority of Japanese Patent Application No. 2014-106206 filed on May 22, 2014, the disclosure of which is incorporated herein by reference.

BACKGROUND

1. Technical Field

This disclosure relates generally to a fluid pressure controlling actuator which is equipped with a casing, a circuit board which is disposed in the casing and to which an electric device working to control the pressure of brake fluid is connected, and a block in which a hydraulic brake circuit is formed and which is attached to the casing.

2. Background Art

Japanese Patent First Publication No. 2012-158228 discloses a brake fluid pressure controlling actuator made in the form of a unit which has a circuit board secured to a block in and on which a hydraulic pressure circuit and a variety of electric devices are disposed. The circuit board has disposed thereon a variety of electric parts for brake fluid pressure control, such as electromagnetic valves or an electric driver for an electric motor, and an electronic controller. The brake fluid pressure controlling actuator is equipped with a casing which covers the circuit board and electronic devices for waterproofing the circuit board. The casing has a portion which extends outside the block and to which a connector is secured to establish an electric connection between the circuit board and an external device.

Specifically, the casing has a first opening in which the electric devices are disposed and a second opening in which the connector is disposed. The first opening is secured to the block. The second opening has, as described above, the connector for achieving the electric connection with the external device.

The electric connection between the circuit board and the electric device such as the electromagnetic valve is achieved by press-fitting terminals extending from the electromagnetic valve into through holes formed in the circuit board.

The press-fitting of the terminals of the electromagnetic valve in the circuit board may, however, fail due to deflection of the circuit board when the terminals are inserted into the holes of the circuit board, which leads to a failure in connection between the circuit board and the electric devices.

SUMMARY

It is therefore an object to provide an improved structure of a brake fluid pressure controlling actuator designed to ensure the stability in electric connection between a circuit board and an electric device.

According to one aspect of the disclosure, there is provided a brake fluid pressure controlling actuator which comprises: (a) a block in which brake pipes are formed; (b) an electric device which is secured to a surface of the block and equipped with a terminal extending outside the block; (c) a casing which is secured to the block and has a wall which faces the surface of the block, the casing including an open chamber in which the electric device is installed; (d) a circuit board which is disposed within the casing so as to face the wall of the casing, the circuit board having a through-hole in which the terminal of the electric device is press-fit in an electric connection with the through-hole, the circuit board being equipped with an electric circuit which works to drive the electric device; and (e) a board support which is disposed on the wall of the casing within the casing. The board support is equipped with a stay which extends toward the circuit board and is placed in contact with a portion of the circuit board around the through-hole in which the terminal of the electric device is press-fit.

In short, the brake fluid pressure controlling actuator is designed to have the board support disposed in the casing and also have the circuit board placed in contact with the stay of the board support. The stay of the board support serves to firmly hold a portion of the circuit board around the through-hole when the terminal of the electric device is press-fitted into the through-hole, thereby minimizing the degree of bending of the circuit board to ensure the stability in electrically connecting the electric device to the circuit board.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

Figure 1:
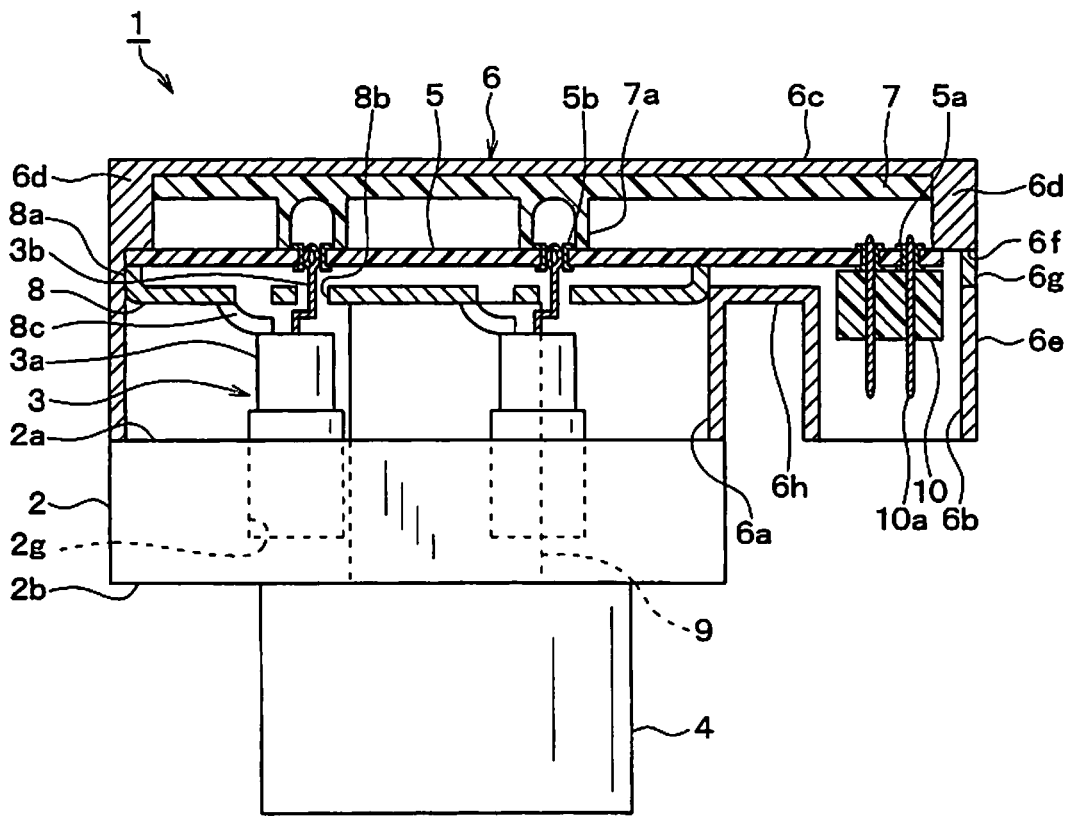
FIG. 1 is a partial sectional side view which illustrates a brake fluid pressure controlling actuator according to an embodiment.

Referring to the drawings, wherein like reference numbers refer to like parts in several views, particularly to FIG. 1, there is shown a brake fluid pressure controlling actuator 1 according to an embodiment.

The brake fluid pressure controlling actuator 1 is employed in a typical brake system for automotive vehicles. Specifically, the brake fluid pressure controlling actuator 1 is disposed between a master cylinder and a wheel cylinder of an automotive brake system to regulate the pressure of brake fluid to be delivered to the wheel cylinder.

The brake fluid pressure controlling actuator 1 includes a block 2, electric devices such as electromagnetic valves 3 (also called solenoid valves) and an electric motor 4, a circuit board 5, a casing 6, a board support 7, and a retainer 8.

The block 2 has brake pipes formed therein (not shown) as a hydraulic brake circuit for use in controlling the pressure of brake fluid. The block 2 is cuboid and has major opposed surfaces: a surface 2a and a surface 2b. The surface 2a has at least the electromagnetic valves 3 disposed thereon. The surface 2b is opposed to the surface 2a in a thickness-wise direction of the block 2 and has the motor 4 mounted thereon. The block 2 is made of, for example, a metal such as aluminum.

The electromagnetic valves 3 are arranged on the surface of the block 2. Specifically, each of the electromagnetic valves 3 is equipped with a coil unit 3a and has a portion other than the coil unit 3a (which will also be referred to as a body below) fit in a chamber 2g formed in the surface 2a of the block 2. For instance, the securement of each of the electromagnetic valves 3 to the block 2 is achieved by inserting the body into the chamber 2g and swaging a portion of the block 2 to hold the body in the chamber 2g tightly. The coil units 3a are located outside the block 2. Each of the coil units 3a has a terminal 3b extending outside thereof. The terminal 3b electrically leads to a solenoid coil installed in the coil unit 3a and is also electrically connected to the circuit board 5 for energizing the solenoid coil.

The coil unit 3a is detachable from the body of the electromagnetic valve 3. This enables only the coil unit 3a to be first connected to the circuit board 5 after which the body fit in the block 2 is joined to the coil unit 3a.

The electric motor 4 is fixed on the surface 2b of the block 2. The block 2 has a pump 9 partially installed therein. The motor 4 is activated to drive the pump 9 to suck or discharge brake fluid for the brake fluid pressure control. The motor 4 has leads (not shown) which pass through, for example, holes extending from the surface 2b to the surface 2a of the block 2 and connect with the circuit board 5. The joints of the leads of the motor 4 to the circuit board 5 may be achieved by soldering or press-fitting techniques.

The block 2 also has a pressure sensor which works to measure the pressure in the master cylinder. The electromagnetic valves 3 and the pressure sensor are electric devices covered by the casing 6.

The circuit board 5 has disposed thereon electric circuits serving to driver electric devices such as the electromagnetic valves 3 and the electric motor 4. The circuit board 5 extends outside the block 2 as viewed in a direction normal to the surfaces 2a and 2b in FIG. 1, in other words, has a portion located on the right side of the block 2, as viewed in FIG. 1, to which a connector 10 is attached. The connector 10 is equipped with a plurality of terminals 10a fit in the circuit board 5. The terminals 10a are electrically connected to the electric circuits on the circuit board 5 via through holes 5a passing through the thickness of the circuit board 5. The electric circuits on the circuit board 5 outputs or receives information to or from an external device through the connector 10. Terminals 3b of the electromagnetic valves 3 are press-fit in through-holes 5b formed in the circuit board 5 to connect with the electric circuits on the circuit board 5. The number of the through-holes 5b corresponds to that of the electromagnetic devices 3.

The circuit board 5 also has an electronic control unit (ECU), not shown, mounted thereon to control operations of the electric devices. The electronic control unit works as a brake ECU to analyze signals inputted from the external device through the connector 10 or an output of the pressure sensor to control operations of the electronic devices to regulate the pressure of the brake fluid.

The casing 6 has open chambers 6a and 6b formed therein. The open chamber 6a faces the block 2. The open chamber 6b has the connector 10 disposed therein. The casing 6 in which the circuit board 5 is arranged is secured to the block 2 so that it covers the electronic devices mounted on the surface 2a of the block 2 in a liquid-tight form.

Specifically, the open chamber 6a has a rectangular opening which is contoured to conform with the surface 2a of the block 2. The casing 6 is attached to the block 2, so that the electronic devices secured to the surface 2a of the block 2 are arranged inside the open chamber 6a. For instance, the joining of the casing 6 to the block 2 is achieved by inserting screws into holes (not shown) formed in corners of the open chamber 6a of the casing 6 and then fastening the screws into internally threaded holes (not shown) formed in corners of the surface 2a of the block 2.

The open chamber 6b is located outside the block 2, as viewed from a lower portion of FIG. 1, so as to have the connector 10 exposed outside the block 2. This enables the connector 10 to be electrically joined to the external device.

The casing 6 has an upper wall 6c opposed to the surface 2a of the block 2. The circuit board 5 is arranged so as to face the wall 6c. It is preferable that the circuit board 5 is disposed to extend substantially parallel to the wall 6c. The board support 7 is disposed along the wall 6c within the casing 6. The board support 7 has, as will be described later in detail, a plurality of stays 7a extending from a major surface thereof away from the wall 6c. The circuit board 5 is retained by the stays 7a at a given interval away from the wall 6c of the casing 6. The circuit board 5 is less subjected to bending near the stays 7a.

The casing 6 has a support 6d which extends from the circumference of the wall 6c toward the circuit board 5. The support 6d is defined by a portion of a side wall 6e extending over the whole of the circumference of the casing 6. The support 6d has an end (i.e., an inner shoulder of the side wall 6e of the casing 6) laid flush with the ends of the stays 7a, that is, the support 6d has a height from the wall 6c of the casing 6 which is equal to that of the stays 7a. In other words, the support 6d extends to have the end contacting with the circuit board 5, thereby supporting the periphery of the circuit board 5. The stays 7a and the support 6d serve to hold the circuit board 5 away from the wall 6c by the height of the stays 7a. The support 6d is, as described above, shaped so as to extend over the whole of the circumference of the casing 6, but may alternatively be made of a plurality of portions of the side wall 6e of the casing 6 which are arranged at given intervals away from each other in a circumferential direction of the casing 6 and extend toward the circuit board 5.

The casing 6 has, as described above, the side wall 6e which extends from the outer edge of the wall 6c of the casing 6 toward the block 2, in other words, extends parallel to a direction normal to the surface 2a of the block 2. The side wall 6e has, as clearly illustrated in FIG. 3, an insertion opening 6f which is formed on one of side surfaces thereof and faces in a planar direction of the circuit board 5. Specifically, the insertion opening 6f is formed in the side surface of the side wall 6e of the casing 6 which defines the open chamber 6b in which the connector 10 is disposed. The insertion opening 6f is, as can be seen from FIG. 3, shaped to have a size large enough to enable the circuit board 5 to be inserted into the casing 6. The casing 6 also has a cover 6g fit in the insertion opening 6f. The cover 6g has a sealing member (not shown) attached to an outer periphery thereof to establish a liquid-tight seal between the cover 6g and the inner peripheral wall of the insertion opening 6f when the cover 6g is fit in the insertion opening 6f. The cover 6g may be welded to the inner periphery of the insertion opening 6f or alternatively be press-fit in the insertion opening 6f.

The casing 6 has a partition wall 6h which defines the open chambers 6a and 6b. When the circuit board 5 is inserted into the casing 6 through the open chamber 6a, it may result in physical interference with the partition wall 6h. It is, thus, advisable that the circuit board 5 is disposed inside the casing 6 through the insertion opening 6f.

The casing 6 is made of resin material, but may alternatively be made of metal as long as the electric circuits on the circuit board 5 are electrically insulated from the casing 6. For instance, the electric insulation is achieved by printing conductive leads (i.e., conductive tracks or pads) of the electric circuits on an area of the circuit board 5 other than a contact with the support 6d. The use of metal as material of the casing 6 enhances the thermal conductivity as compared with when the casing 6 is made of resin, thus facilitating the ease with which the heat, as generated from the electronic devices such as the brake ECU mounted on the circuit board 5 and the electromagnetic valves 3, is dissipated outside the casing 6. This results in improved thermal dissipation of the brake fluid pressure controlling actuator 1.

The board support 7 is formed by a plate extending along the wall 6c of the casing 6. The plate may be made of an insulating material such as resin. The board support 7 is disposed in contact with the inner surface of the support 6d, so that it is positioned in place within the casing 6. The board support 7, as described above, has the stays 7a extending toward the circuit board 5 from one of the major surfaces thereof which is farther away from the wall 6c of the casing 6. The stays 7a are, as clearly illustrated in FIG. 3, of a hollow cylindrical shape and arrayed substantially in coincidence with through-holes 5b of the circuit board 5 in which the terminals 3b of the electromagnetic valves 3 are fit. For instance, in the case where the brake fluid pressure controlling actuator 1 is of a so-called 8-sol type equipped with, as demonstrated in FIG. 3, the eight electromagnetic valves 3, the eight stays 7a are arrayed in alignment with the respective electromagnetic valves 3. Each of the electromagnetic valves 3 has the two terminals 3b. Each of the stays 7a works to support a portion of the circuit board 5 around corresponding two of the through-holes 5b, thereby minimizing the bending of the circuit board 5 when the terminals 3b of the electromagnetic valves 3 are press-fit in the through-holes 5b, and thus ensuring the stability in electrically connecting the terminals 3b with the conductive through-holes 5b.

Each of the stays 7a is, as described above, of a hollow cylindrical shape, but may be made of a bar or formed to have another shape. In this embodiment, each of the stays 7a supports the circuit board 5 around the terminals 3b of a corresponding one of the electromagnetic valves 3.

The board support 7 is disposed so as to occupy substantially the whole of the inner surface of the wall 6c of the casing 6, that is, extends across the partition wall 6h, but may alternatively be shaped to face only the open chamber 6a. In this case, the support 6d is preferably shaped to extend around the outer periphery of the open chamber 6b, so that it contacts with the periphery of the board support 7 to position the board support 7 in place within the casing 6.

Figure 3:
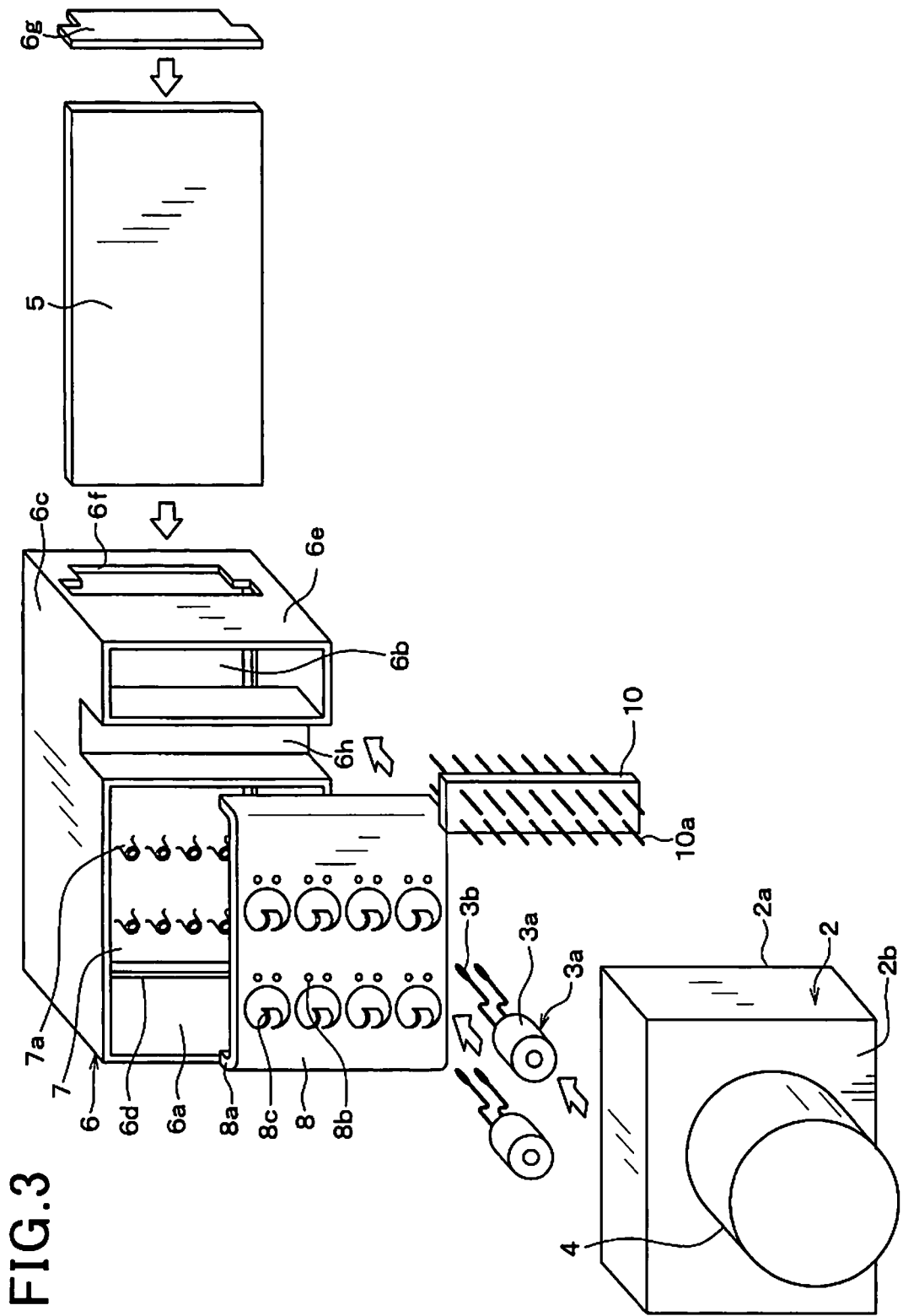
FIG. 3 is an exploded perspective view which illustrates the brake fluid pressure controlling actuator of FIG. 1.

The retainer 8 is, as clearly illustrated in FIG. 3, made of a plate and disposed inside the open chamber 6a of the casing 6 to press the circuit board 5 against the wall 6c, thereby retaining the circuit board 5 in abutment with the end of the support 6d and the ends of the stays 7a. The retainer 8 may be secured to the casing 6 using screws. In this embodiment, the retainer 8 is press-fit in the casing 6 in abutment with the inner wall of the casing 6 which defines the open chamber 6a. This eliminates the need for the screws, thus decreasing the number of parts of the brake fluid pressure controlling actuator 1.

The retainer 8 includes supports 8a formed by curved ends of the retainer 8. The supports 8a extend from a major portion of the retainer 8 in alignment with the support 6d of the casing 6, in other word, protrude toward contacts of the circuit board 5 with the support 6d. The support 6d and each of the supports 8a hold the circuit board 5 tightly therebetween to retain the circuit board 5 firmly in the casing 6.

The retainer 8 has formed therein openings or holes 8b located in alignment with the terminals 3b of the electromagnetic valves 3. Specifically, the terminals 3b extend from below to above the retainer 8, as viewed in FIG. 1, through the holes 8b and contact with the circuit board 5. The retainer 8 also includes a plurality of elastic supports 8c formed near the holes 8b. Each of the elastic supports 8c is curved so as to protrude toward a corresponding one of the electromagnetic valves 3. Each of the elastic supports 8c is made by drilling the plate-like major portion of the retainer 8 to as to form a strip or tab and bending the tab in a direction opposite a direction in which the supports 8a extend from the major portion of the retainer 8. Each of the elastic supports 8c is placed, as clearly illustrated in FIG. 1, in contact with the upper end of one of the electromagnetic valves 3 which faces the circuit board 5, so that it elastically presses the electromagnetic valve 3 against the block 2, thereby suppressing mechanical vibration of the electromagnetic valve 3. This eliminates dislodgement of the terminals 3b from the through-holes 5b of the circuit board 5 due to the vibration of the electromagnetic valves 3 and thus ensures the stability of electric connection of the terminals 2b with the circuit board 5.

The production method of the brake fluid pressure controlling actuator 1 will be described below with reference to FIGS. 2(a), 2(b), 2(c), and 3.

First, the casing 6 with the insertion opening 6f not closed by the cover 6g is prepared. The board support 7 is inserted into the casing 6 through the open chamber 6a or the insertion opening 6f. The board support 7 is then placed in direct contact with the inner surface of the wall 6c of the casing 6. Afterwards, the circuit board 5 is put into the casing 6 through the insertion opening 6f. The board support 7 may be laid across the partition wall 6h in contact with substantially the whole of the inner surface of the wall 6c. In this case, it is advisable that the board support 7 be inserted through the insertion opening 6f. The board support 7, however, may be inserted into the casing 6 through the open chamber 6a. The board support 7 may alternatively be laid so as to face only the open chamber 6a. In this case, it is advisable that the board support 7 be inserted into the casing 6 through the open chamber 6a and laid in contact with a portion of the inner surface of the wall 6c which is oriented to the open chamber 6a.

Figure 2A:
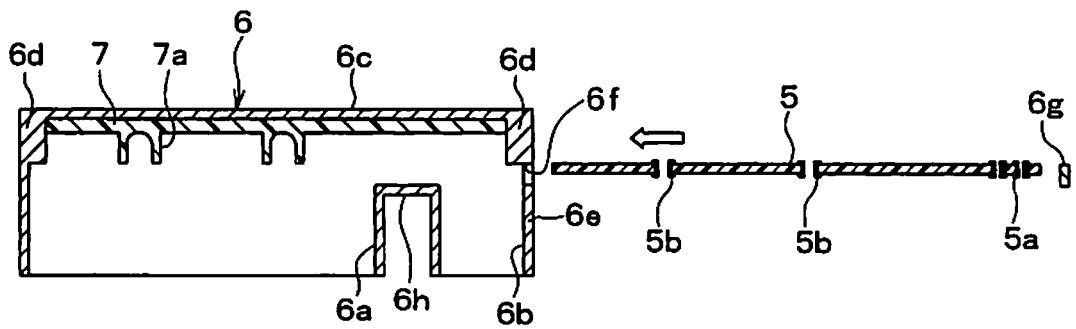
FIG. 2(a) is a sectional view which demonstrates one of the steps of production of the brake fluid pressure controlling actuator of FIG. 1.
Figure 2B:
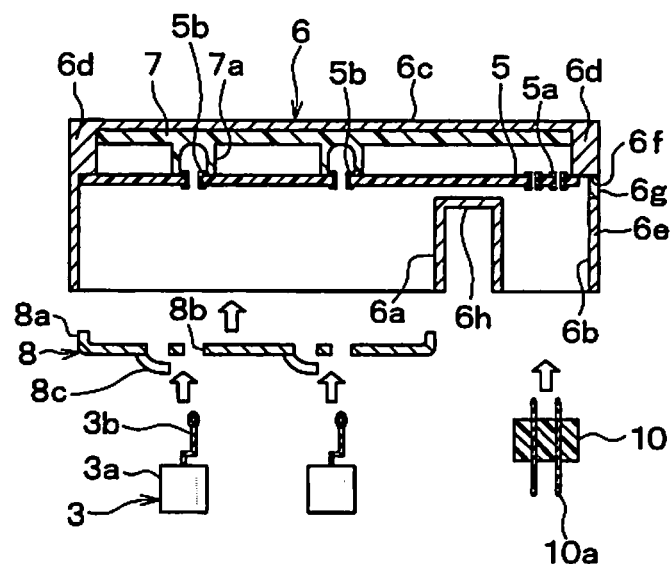
FIG. 2(b) is a sectional view which demonstrates one of the steps of production of the brake fluid pressure controlling actuator following the one in FIG. 2(a)

Subsequently, the retainer 8 is, as illustrated in FIGS. 2(b) and 3, press-fit into the open chamber 6a and urges the circuit board 5 at the supports 8a against the supports 6d of the casing 6, thereby holding the circuit board 5 firmly through the supports 6d and 8a.

Afterwards, the insertion opening 6f is closed by the cover 6g. The attachment of the cover 6g to the casing 6 may be achieved by press-fitting the cover 6g with the sealing member installed around the circumferential edge thereof into the insertion opening 6f. This eliminates the need for, for example, a vibration welding machine, to weld the cover 6g to the casing 6, thus facilitating the ease with which the cover 6g is secured to the casing 6. A portion of the wall 6c may be made as a cover separate from the other portion of the wall 6c to form an opening in the wall 6c in order that the circuit board 5 is put into the casing 6 through the opening. This, however, requires the need for hermetically sealing a wider area around the opening of the wall 6c. The cover 6g may be made to be small in size, thus ensuring the stability in hermetically sealing around the cover 6g.

The coil units 3a are put into the casing 6 through the open chamber 6a. Simultaneously, the terminals 3b of the coil units 3a are press-fit into the through-holes 5b. This establishes physical and electrical connections of the terminals 3a with a metallic coat on the inner surfaces of the through-holes 5b. The connector 10 is put into the open chamber 6b to connect the terminals 10a of the connector 10 physically and electrically to the electric circuits on the circuit board 5. The electrical connections of the terminals 10a to the electric circuits on the circuit board 5 may be accomplished, like the terminals 3b, by press-fitting the terminals 10a into the through-holes 5a whose inner surfaces are coated with conductive material.

Figure 2C:
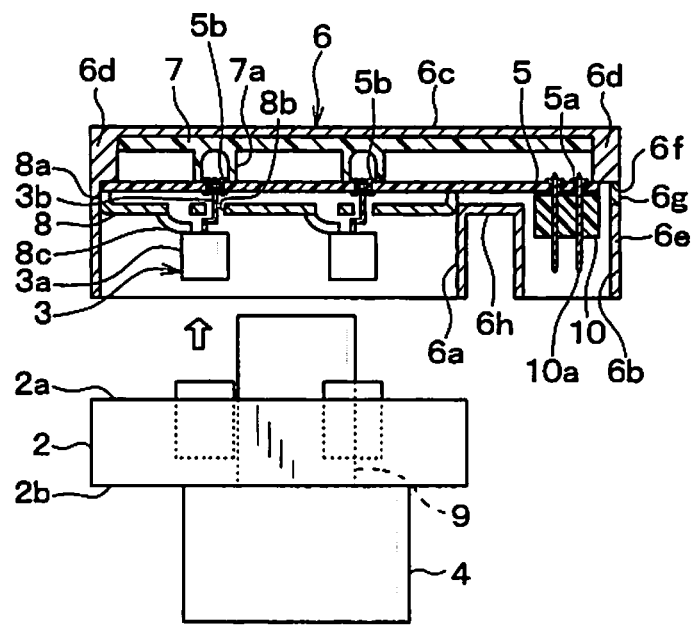
FIG. 2(c) is a sectional view which demonstrates one of the steps of production of the brake fluid pressure controlling actuator following the one in FIG. 2(b)

The block 2 is prepared, as illustrated in FIGS. 2(c) and 3, to which the bodies of the electromagnetic valves 3 other than the coil units 3a and the electric motor 4 are secured. The block 2 is put on the casing 6 so as to close the open chamber 6a. The mechanical joint of the block 2 to the casing 6 may be achieved by inserting screws into holes (not shown) formed in corners of the open chamber 6a of the casing 6 and then fastening the screws into internally threaded holes (not shown) formed in corners of the surface 2a of the block 2. This completes the brake fluid pressure controlling actuator 1, as illustrated in FIG. 1.

As apparent from the above discussion, the brake fluid pressure controlling actuator 1 is designed to have the board support 7 disposed in the casing 6 and also have the circuit board 5 placed in contact with the stays 7a of the board support 7. Each of the stays 7a of the board support 7 serves a press to firmly hold a portion of the circuit board 5 around at least a corresponding one of the through-holes 5b when the terminals 3b of the electromagnetic valves 3 are press-fitted into the through-holes 5b, thereby minimizing the degree of bending of the circuit board 5 to ensure the stability in electrically connecting the electromagnetic valves 3 to the circuit board 5.

The retainer 8 is disposed on the opposite side of the circuit board 5 to the wall 6c of the casing 6 so as to hold the circuit board 5 tightly between the supports 6d and 8a. In other words, the circuit board 5 is retained at a plurality of supports in place within the casing 6, thus ensuring the stability in securement of the circuit board 5 at a preselected position within the casing 6.

The retainer 8 is equipped with the elastic supports 8c to elastically urge the electromagnetic valves 3 against the block 2, thereby absorbing the mechanical vibrations of the electromagnetic valves 3 being in operation to avoid the dislodgement of the terminals 3b from the through-holes 5b. This minimizes the risk of electrical disconnection of the electromagnetic valves 3 from the circuit board 5.

While the present invention has been disclosed in terms of the preferred embodiment in order to facilitate better understanding thereof, it should be appreciated that the invention can be embodied in various ways without departing from the principle of the invention.

Figure 4:
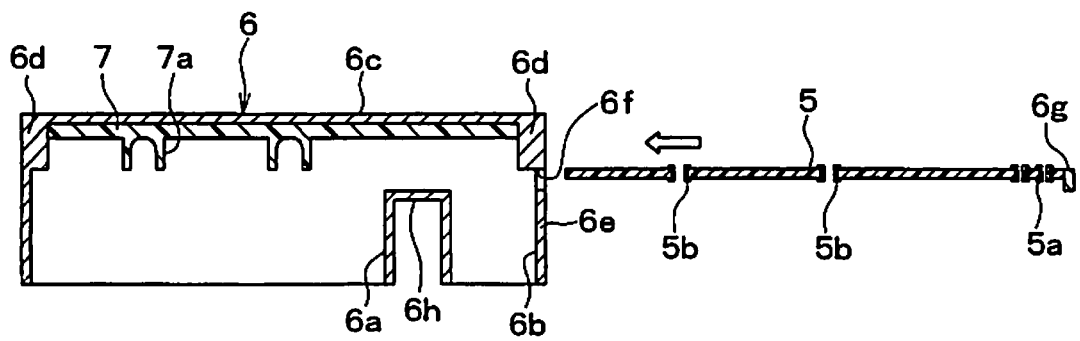
FIG. 4 is a sectional view which illustrates modifications of a casing and a circuit board of the brake fluid pressure controlling actuator of FIG. 1.
Figure 5:
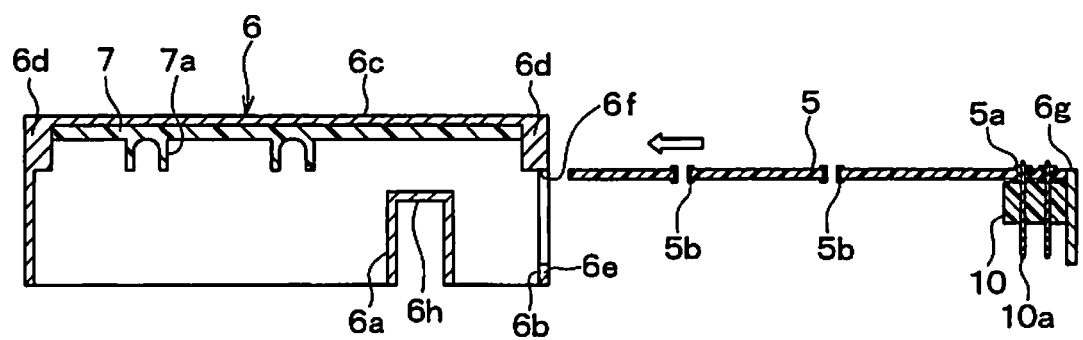
FIG. 5 is a sectional view which illustrates second modifications of a casing and a circuit board of the brake fluid pressure controlling actuator of FIG. 1.

The cover 6b is, as described above, separate from the circuit board 5, however, an assembly of the circuit board 5 and the cover 6g which is, as illustrated in FIG. 4, secured or adhered to the end of the circuit board 5 may be prepared and inserted into the casing 6 through the insertion opening 6f. The casing 6 may be, as illustrated in FIG. 5, shaped to have the insertion opening 6f and the cover 6g which are both greater in size than the ones in the above embodiment. The cover 6g is attached to the end of the circuit board 5. The connector 10 is attached to the circuit board 5. This assembly is inserted into the casing 6 through the insertion opening 6f.

The block 2 may be attached to the casing 6 without using screws. For instance, such attachment may be achieved by inserting a portion of the block 2 into the open chamber 6a and swaging a portion of the casing 6 around the open chamber 6a to make a mechanical joint with the block 2 or welding a contact between the block 2 and the casing 6 which are made of the same metallic material. The casing 6 may be made of die-cast aluminum. In this case, the swaging of the casing 6 to make a mechanical joint with the block 2 is achieved easily.

The pump 9 is illustrated as being a trochoid pump, however, it may be engineered as a plunger pump.

The insertion opening 6f is formed in one of four faces of the side wall 6e of the casing 6 which, as can be seen in FIG. 3, directly faces, in other words, is closest to the side surface of the connector 10, however, may alternatively be made in another face of the side wall 6e, for example, one of the faces of the side wall 6e farther away from the connector 10 or extending perpendicular to the face of the side wall 6e, as illustrated in FIG. 3, in which the insertion opening 6f is formed.

What is claimed is:

1. A brake fluid pressure controlling actuator comprising:
a block in which brake pipes are formed;
an electric device which is secured to a surface of the block and equipped with a terminal extending outside the block;
a casing which is secured to the block and which has a wall which faces the surface of the block, the casing including an open chamber in which the electric device is installed;
a circuit board which is disposed within the casing so as to face the wall of the casing, the circuit board having a through-hole in which the terminal of the electric device is press-fit in an electric connection with the through-hole, the circuit board being equipped with an electric circuit which works to drive the electric device; and
a board support which is disposed on the wall of the casing within the casing, the board support being equipped with a stay which extends toward the circuit board and is placed in contact with a portion of the circuit board around the through-hole in which the terminal of the electric device is press-fit.

2. A brake fluid pressure controlling actuator as set forth in claim 1, wherein the casing also has a support extending from the wall of the casing toward the circuit board, the support having a height from the wall of the casing which is equal to that of the stay, and wherein the circuit board is placed in contact with the stay and the support of the casing.

3. A brake fluid pressure controlling actuator as set forth in claim 2, further comprising a retainer which is disposed on an opposite side of the circuit board to the wall of the casing to hold the circuit board, the retainer being made of a plate with a support extending toward the casing in alignment with the support of the casing, and wherein the support of the casing and the support of the retainer serve to hold the circuit board therebetween.

4. A brake fluid pressure controlling actuator as set forth in claim 3, wherein the retainer has an elastic support which protrudes toward the electric device, the elastic support working to elastically urge the electric device against the block.

5. A brake fluid pressure controlling actuator as set forth in claim 3, wherein the retainer is press-fit in the casing in abutment with an inner wall of the casing which defines the open chamber.

6. A brake fluid pressure controlling actuator as set forth in claim 1, wherein the casing is made of metallic material.

7. A brake fluid pressure controlling actuator comprising:
a block in which brake pipes are formed;

a plurality of electric devices which are secured to a surface of the block and each of which is equipped with a terminal extending outside the block;

a casing which is secured to the block and has a wall which faces the surface of the block, the casing including an open chamber in which the electric device is installed;

a circuit board which is disposed within the casing so as to face the wall of the casing, the circuit board having through-holes whose number corresponds to the number of the electric devices and in which the terminals of the electric devices are press-fit in electric connections with the through-holes, the circuit board being equipped with an electric circuit which works to drive the electric devices; and a board support which is disposed on the wall of the casing within the casing, the board support being equipped with a plurality of stays which extend toward the circuit board and are placed in contact with portions of the circuit board around the through-holes in which the terminals of the electric devices are press-fit.

* * * * *